Sept. 30, 1924.                 1,510,135
J. W. BROWN, JR
MACHINE TOOL
Filed May 7, 1923          3 Sheets-Sheet 1

INVENTOR.
John Wilson Brown Jr.

Sept. 30, 1924.  
J. W. BROWN, JR  
MACHINE TOOL  
Filed May 7, 1923  
1,510,135  
3 Sheets-Sheet 2

Inventor.
John Wilson Brown Jr.

Sept. 30, 1924.

J. W. BROWN, JR

MACHINE TOOL

Filed May 7, 1923

1,510,135

3 Sheets-Sheet 3

Inventor.

John Wilson Brown Jr.

Patented Sept. 30, 1924.

1,510,135

UNITED STATES PATENT OFFICE.

JOHN WILSON BROWN, JR., OF PHILADELPHIA, PENNSYLVANIA.

MACHINE TOOL.

Application filed May 7, 1923. Serial No. 637,180.

*To all whom it may concern:*

Be it known that I, JOHN WILSON BROWN, Jr., a citizen of the United States, and resident of the city of Philadelphia, in the county of Philadelphia and State of Pennsylvania, have invented a new and useful Machine Tool, of which the following is a specification.

My invention belongs to that class of machine tools in which a series of work-holding devices, each having a tool opposed to it, revolves continuously about an axis, the series of tools moving synchronously about the same axis, the relative position lateral to said axis of each work-holder and its tool remaining unchanged.

The purpose of my invention is to provide such a machine, which will be adapted to perform successive operations on the same piece by transferring the piece from one work-holder to another until finished and which shall be so arranged that there will always be an empty work-holder ready to receive the piece when so transferred. Further to provide a drilling or boring machine of this class in which the speed of rotation of each spindle is independent of the speed of any other spindle, in which the feed of any work-holder toward the spindle is independent of the feed of any other work-holder and in which some of the spindles may be fed toward their respective work-holders and some of the work-holders may be fed toward their respective spindles. Further to so construct the machine tool that it may be easy of construction, durable and rapid of operation.

Figure 1:
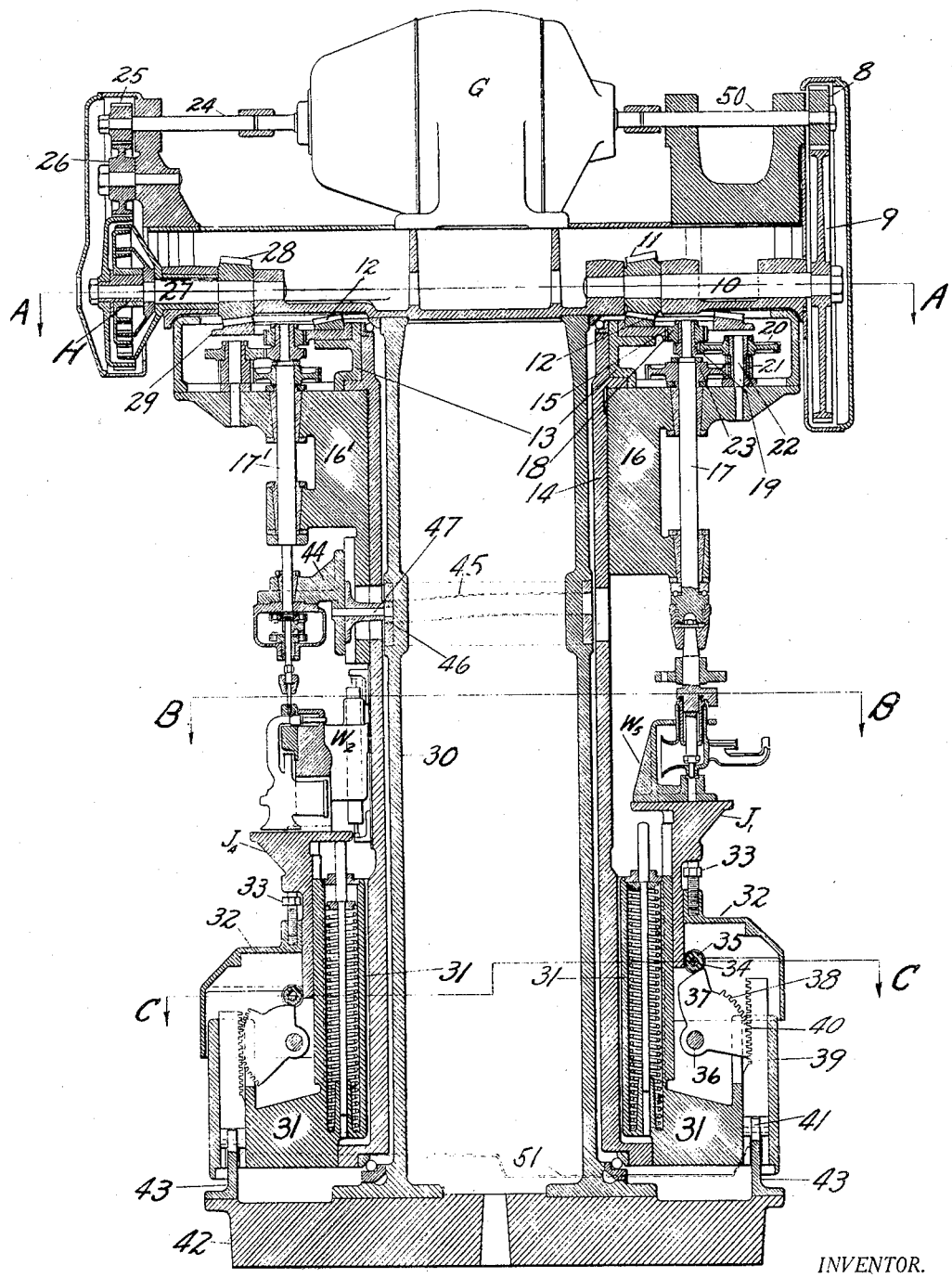
Figure 2:
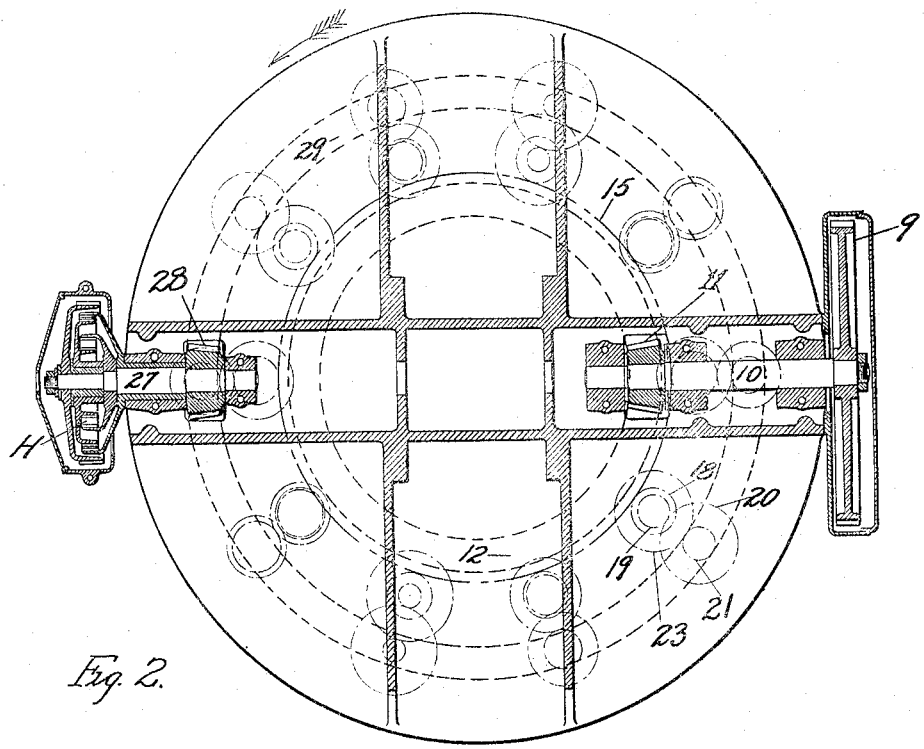
Figure 3:
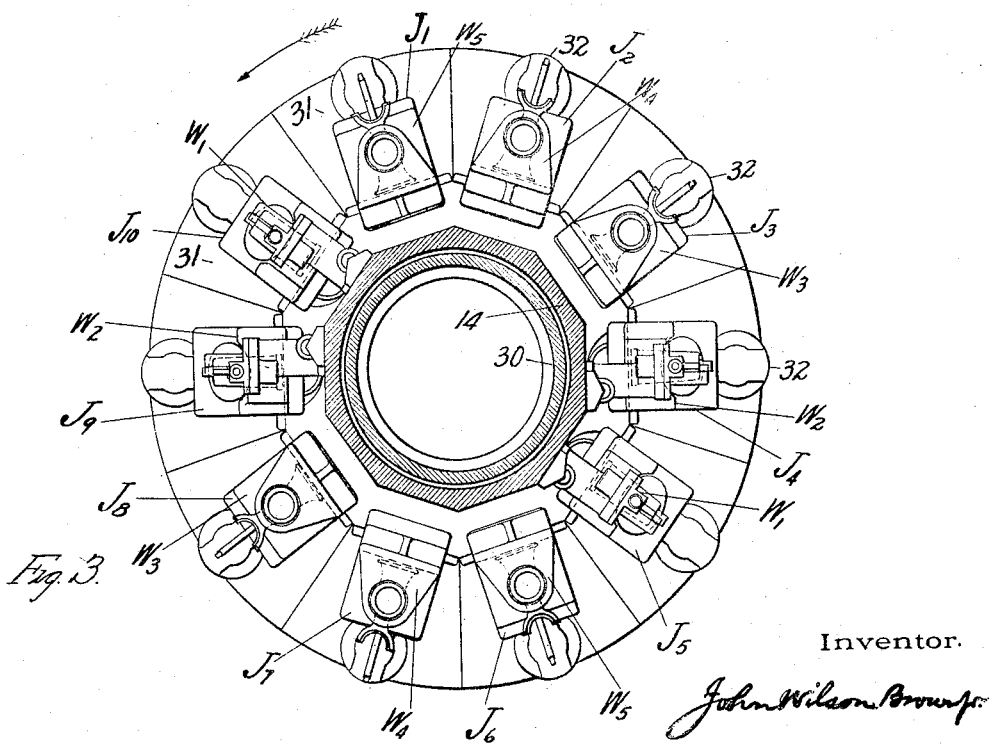
Figure 4:
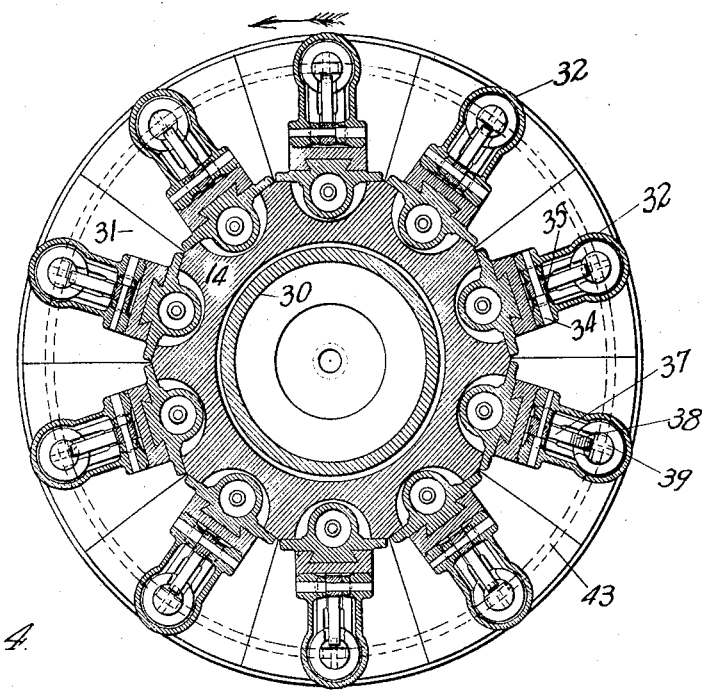
Figure 5:
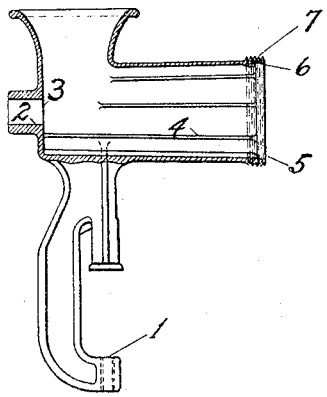

Referring to the drawings; Fig. 1 is a vertical sectional view of my improved machine tool; Fig. 2 is a horizontal sectional view on the plane A—A; Fig. 3 is a like view on plane B—B; Fig. 4 is a like view on plane C—C; Fig. 5 is a sectional view of the piece, the successive operations on which are shown, for purposes of illustration, as being performed by my improved machine tool. This piece requires to be drilled at 1 with a $\frac{3}{8}''$ drill, tapped at 1 with a $\frac{7}{16}''$ tap, reamed and faced with a compound tool at 2, 3, 4, 5, drilled at 6 with a $\frac{5}{32}''$ drill, and threaded at 7 with a thread $\frac{3}{14}''$ diameter and 12 pitch.

G is an electric motor one end of whose shaft is coupled to shaft 50 which has, at its end, pinion 8 which drives, through gear 9, shaft 10 and bevel pinion 11 the bevel gear 12. To the gear 12 is secured the spur gear 15, which revolves freely on frame 13 which is secured to carrier 14. To the carrier 14 are secured the brackets 16, 16'. Mounted in these brackets are the spindles 17, 17'. Running loose on these spindles and meshing with the gear 15 are the pinions 18. Secured to each pinion 18 is a gear 19 which meshes with a gear 20 which is secured to a gear 21 and with it runs loose on stud 22. Gear 21 meshes with gear 23 which is secured to spindle 17. The speed of each spindle is fixed by the respective diameters of gears 19, 20, 21 and 23 and is therefore independent of the speed of any other spindle. The other end of the motor shaft is coupled to shaft 24 which carries on its end pinion 25 which drives through gear 26, planetary gearing H, shaft 27 and bevel pinion 28 the bevel gear 29 which is secured to frame 13 which is in its turn secured to carrier 14. By this means carrier 14 is given a constant motion of revolution about the axis of column 30 in the direction of the arrow. Secured to carrier 14 are the brackets 31. Mounted on the brackets 31, free to slide in the direction parallel to the axis of 30 are the work tables $J_1$, $J_2$ &c. Mounted on each table is a bracket 32. This can be adjusted in the direction parallel to the axis of 30 by screw 33. Mounted in 32 on shaft 34 is a roller 35. Mounted in bracket 31 is the shaft 36 on which revolves loose the cam 37 upon which the roller 35 rests. Integral with cam 37 is spur gear segment 38. Mounted in bracket 31 is a plunger 39 having a rack 40 which meshes with segment 38. At the lower end of plunger 39 said plunger carries a roller 41. Column 30 is bolted to base 42. Secured to base 42 is a ring cam 43 upon which the rollers 41 ride. The surface of cam 43, except at depressed portion 51, is a true helix, so that when the carrier 14 is revolving about the axis of the column at a constant rate of speed the plungers 39 will rise at a constant rate of speed. Mounted on bracket 16' is a slide 44 which carries a tapping attachment of a well known type. Mounted on column 30 is the stationary cam 45 which through roller 46 and stud 47 causes slide 44 to move vertically and so operate the tapping attachment. The proper sequence of the operations on the piece of work shown is; drilling at 1 in work-holder $W_1$; tapping at 1 in work-holder $W_2$; reaming &c. in work-holder $W_3$; drilling at 6 in work-holder $W_4$; threading in work-holder $W_5$. In this case two series of work-holders of five work-holders each are mounted on the tables $J_1$, $J_2$ &c. two series of tools, of five tools each, are mounted in the spindles, each tool being mounted in that spindle which mates with the table which carries its appropriate work-holder. The tables are numbered in the order in which they present themselves at any fixed point in their path of revolution. The work-holders are mounted $W_5$ on $J_1$, $W_4$ on $J_2$, $W_3$ on $J_3$, $W_2$ on $J_4$, $W_1$ on $J_5$, $W_5$ on $J_6$, $W_4$ on $J_7$, $W_3$ on $J_8$, $W_2$ on $J_9$, $W_1$ on $J_{10}$. It will be noted that the work-holders are presented at any fixed point of the revolution about the axis of the column in the order inverse to that in which the operations are performed. This is essential to the proper operation of the machine. Work-holders may be used which are not fixed to the machine.

In operation the tables $J_1$, $J_2$ &c. with their work-holders pass continuously in front of the operator who is located at the point where the tables are at their lowest point of vertical travel. As each work-holder passes him he takes from it the work and places it in the work-holder which next preceded the work-holder from which he has taken it. In this way there is always a work-holder ready to receive the work and there is no need to lay it aside while a work-holder is emptied as would be the case with any other arrangement of work-holders. When the piece is transferred from the work-holder for the first operation said work-holder is filled with an entirely fresh piece; similarly, when the piece is taken from the work-holder for the last operation, it is not transferred to another work-holder but laid aside as finished.

In the case of the layout shown in Fig. 3; table $J_1$ carrying work-holder $W_5$ reaches the operator with a piece completely finished; this piece he removes and replaces it with the piece presented to him by table $J_2$ carrying work-holder $W_4$; work-holder $W_4$ he fills with the piece presented to him by table $J_3$ carrying work-holder $W_3$; work-holder $W_3$ on table $J_3$ he fills with the piece presented to him by table $J_4$ carrying work-holder $W_2$; work-holder $W_2$ on table $J_4$ he fills with the piece presented to him by table $J_5$ carrying work-holder $W_1$; work-holder $W_1$ on table $J_5$ he fills with an entirely fresh piece; table $J_6$ carrying work-holder $W_5$ presents him with a finished piece which he removes; work-holder $W_5$ on table $J_6$ he fills with the piece presented by table $J_7$ carrying work-holder $W_4$; work-holder $W_4$ on table $J_7$ he fills with the piece presented by table $J_8$ carrying work-holder $W_3$; work-holder $W_3$ on table $J_8$ he fills with the piece presented by table $J_9$ carrying work-holder $W_2$; work-holder $W_2$ on table $J_9$ he fills with the piece presented by table $J_{10}$ carrying work-holder $W_1$; work-holder $W_1$ on table $J_{10}$ he fills with a fresh piece, and so on continuously.

As the table passes from the operator the plunger 39 is raised by cam 43 and in its turn revolves the segment 38 and with it the cam 37. This cam may be of any desired shape and the feed of each table is therefore independent of the feed of all other tables.

When the table has returned to the operator's station it will have been raised and lowered in the manner determined by its cam 37 and the operation for which its work-holder and corresponding tool are adapted will have been finished. Work-holders not secured to the tables may be used, in which case the work-holder is moved from table to table instead of the work being moved from holder to holder. In this case it is necessary that the work-holder be moved always to the table preceding it in the motion of revolution so that there will always be a table ready for its reception. By means of the screw 33 the height of the table at the topmost point of its vertical travel can be adjusted so as to bring the work-holder on any table into proper relation to its tool.

I claim:

1. A series of tables revolving about an axis, a tool opposed to each table, said tools being adapted to perform successive operations on the same article, the tools being so arranged that the tool for the succeeding operation precedes in the path of revolution the tool for the preceding operation and means for revolving the tools about said axis in synchronism with the tables.

2. A series of work-holders revolving continuously about an axis, a series of different tools, one tool opposed to each work-holder and moving synchronously with it about the same axis, successive pairs of tool and work-holder being adapted to perform different operations on the same article.

3. A series of work-holders revolving continuously about an axis, a series of different tools, one tool opposed to each work-holder and moving synchronously with it about the same axis, successive pairs of tool and work-holder being adapted to perform different operations on the same article, the pair of tool and work-holder for the succeeding operation being that pair which, in the motion of revolution, precedes the pair for the preceding operation.

4. A series of work-holders revolving continuously about an axis, a spindle opposed to each work-holder and moving synchronously with it about the same axis, and means for revolving any spindle at a speed different from the speed of the other spindles of the series.

5. A series of work-holders revolving continuously about an axis, a spindle opposed to each work-holder and moving synchronously with it about the same axis and means for changing the relative position, in the direction parallel to the axis of the spindle, of the spindle and work-holder of any pair of spindle and work-holder at a rate independent of the rate of the like change of position of any other pair.

6. A carrier revolving continuously about an axis, spindles in the carrier, means for driving the spindles, a work-holder opposed to each spindle and moving with it, a stationary ring cam, a plunger for each work-holder, a rack in said plunger, a gear segment for each plunger and a cam connected to each gear segment.

7. A series of work-holders revolving about an axis, a stationary cam, a plunger for each work-holder and a cam connected to each plunger.

8. A work-holder revolving about an axis, a stationary ring cam about the same axis and a spiral cam whose acting face comprises spirals of different pitches moving with the work-holder.

9. A work-holder revolving about an axis, a stationary ring cam about the same axis, a spiral cam whose acting surface comprises spirals of different pitches moving with the work-holder and means for actuating the second said cam, by the first said cam.

10. A series of work-holders revolving about an axis, a spindle opposed to each work-holder and moving synchronously with it about the same axis and means whereby the motion of revolution of said work-holders and spindles causes change in the relative position, in the direction parallel to the axis of the spindle, of the spindle and work-holder of any pair of spindle and work-holder at a rate independent of the rate of a like change of position of any other pair.

11. A work-holder revolving about an axis a spiral cam whose acting face comprises spirals of different pitches moving with the work-holder and means for revolving the cam about its own axis.

12. A work-holder revolving about an axis, a spiral cam whose acting face comprises spirals of different pitches moving with the work-holder and serving to vary the position of the work-holder in the direction parallel to said axis and means for revolving the cam about its own axis.

JOHN WILSON BROWN, Jr.